(12) United States Patent
Sato et al.

(10) Patent No.: US 8,520,870 B2
(45) Date of Patent: Aug. 27, 2013

(54) TRANSMISSION DEVICE AND TRANSMISSION METHOD

(75) Inventors: Katsuyuki Sato, Tokyo (JP); Kazuhiro Sato, Tokyo (JP); Teppei Sato, Kanagawa (JP)

(73) Assignee: Sony Corporation, Tokyo (JP)

( * ) Notice: Subject to any disclaimer, the term of this patent is extended or adjusted under 35 U.S.C. 154(b) by 372 days.

(21) Appl. No.: 13/038,645

(22) Filed: Mar. 2, 2011

(65) Prior Publication Data

US 2011/0222715 A1 Sep. 15, 2011

(30) Foreign Application Priority Data

Mar. 12, 2010 (JP) ................................ 2010-056343

(51) Int. Cl.
*H04R 5/02* (2006.01)
(52) U.S. Cl.
USPC .................. 381/303; 381/77; 381/79; 700/94
(58) Field of Classification Search
USPC ............... 381/303, 77, 79; 700/94; 370/458, 370/493, 498; 375/240.01, 240.16; 348/416.1, 348/500
See application file for complete search history.

(56) References Cited

U.S. PATENT DOCUMENTS

2007/0116306 A1* 5/2007 Riedel et al. .................. 381/303

FOREIGN PATENT DOCUMENTS

JP 2007-514350 A 5/2007

* cited by examiner

*Primary Examiner* — Vivian Chin
*Assistant Examiner* — Paul Kim
(74) *Attorney, Agent, or Firm* — Wolf, Greenfield & Sacks, P.C.

(57) ABSTRACT

A transmission device includes: a communication unit performing communication with one or more receiving devices; a distance measurement unit measuring direct distances to the receiving devices; a transmission data setting unit setting transmission data including content data including audio and time information indicating the time when reproduction of content data is started for the receiving devices whose distances are measured based on the measured distances; and a transmission processing unit transmitting transmission data set by the transmission data setting unit to corresponding receiving devices of transmission targets all at once. The transmission data setting unit sets time when the device itself starts reproduction of the content data as a reference time, and sets the time information for synchronizing audio indicated by the content data reproduced in the device itself with audio indicated by the content data reproduced in the receiving devices for each receiving device using the set reference time.

7 Claims, 7 Drawing Sheets

FIG.4

| IDENTIFIER | LENGTH | TIME STAMP (TIME INFORMATION) | AUDIO DATA (320 SAMPLE) (EXAMPLE OF CONTENT DATA) |
|---|---|---|---|

TRANSMISSION DEVICE AND TRANSMISSION METHOD

BACKGROUND OF THE INVENTION

1. Field of the Invention

The present invention relates to a transmission device and a transmission method.

2. Description of the Related Art

In recent years, a content reproduction system transmitting/receiving content data including audio such as audio data and video data among devices and reproducing content data transmitted/received in respective devices is becoming popular. As the content reproduction system, for example, a multichannel audio system (surround system) and systems complying with a DLNA (Digital Living Network Alliance) standard can be cited.

Under the above circumstances, a technique for providing listening experience more suitable for a user who listens to audio to be reproduced is under development. As a technique of dynamically adjusting a sweet spot (optimum listening area) based on a user's position who listens to audio to be reproduced, for example, JP-T-2007-514350 (Patent Document 1) is cited.

SUMMARY OF THE INVENTION

The related art for providing listening experience more suitable for the user (hereinafter may be referred to as "related art") provides the user three-dimensional realistic sensation by dynamically adjusting the sweet spot of a sound field in the multichannel audio system. More specifically, in the related art, the sweet spot is adjusted by tracking a position of a personal device belonging to the user so that the present position of the personal device will be the sweet spot of the sound field. That is, in the case of using the related art, the sweet spot can be dynamically adjusted so that the user's position becomes within the sweet spot of the sound field even when the user possessing the personal device moves, as long as the user moves to the area in which the sweet spot can be adjusted by the content reproduction system according to the related art. Accordingly, it is possible to create three-dimensional realistic sensation at the position of the personal device when using the related-art technique, therefore, listening experience more suitable for the user may be provided.

Here, the content reproduction system in which content data including audio (hereinafter may be referred to as merely a "content data") is transmitted/received among devices and the content data transmitted/received among respective devices is reproduced is not limited to the multichannel audio system to which the related-art technique is applied. For example, a system can be conceived as the content reproduction system, in which a transmission device transmitting content data transmits transmission data including the same content data to one or more receiving devices all at once and the transmission device and respective receiving devices are synchronized with one another to reproduce the content data. In the content reproduction system reproducing the content data indicating the same content in synchronization among the transmission device and respective receiving devices as described above (hereinafter may be referred to as merely a "content reproduction system"), for example, the transmission device transmits transmission data including content data and a time stamp defining the time when the content data is reproduced to the respective receiving devices. Then, the receiving devices reproduce content data included in the transmission data at the time defined by the time stamp included in the received transmission data to thereby realize reproduction of the content data in synchronization among the transmission device and respective receiving devices.

When the content data indicating the same content is reproduced in synchronization among the transmission device and respective receiving devices as described above, for example, it is possible to allow the same music (an example of contents) to be outputted from plural devices (examples of the transmission device and the receiving device) which can reproduce content data existing at home, which enables the user to enjoy the music throughout the home. However, in the content reproduction system reproducing content data indicating the same content in synchronization among the transmission device and respective receiving devices as described above, it may be difficult to provide the listening experience more suitable for the user when a lag (unintentional lag) occurs in audio outputted from plural devices due to delay.

As more specific explanation, audio outputted from respective devices included in the content reproduction system proceeds through the air at a given speed (sound speed) of 340 [m/sec] (in the case of 20° C., 1 atm). Accordingly, when the distance between one device included in the content reproduction system and the other device included in the content reproduction system is, for example, 10 [m], audio corresponding to content data outputted from the other device is heard with a delay of approximately 30 [msec] in the one device. When the above distance is, for example, 20 [m], audio corresponding to content data outputted from the other device is heard with a delay of approximately 60 [msec] in the one device. That is, when respective devices reproducing content data in the content reproduction system are apart from one another to some degree, audio outputted by other devices is heard with a delay in a device to be a reference (hereinafter may be referred to as a "reference device") when a certain device included in the content reproduction system is used as a reference.

As described above, when user positioned in the vicinity of the position of the reference device listens to audio corresponding to content data reproduced in synchronization among all devices included in the content reproduction system, the user hears audio in a state in which audio outputted from the reference device is out-of-sync with the delayed audio outputted from other devices. Therefore, even when respective devices reproduce the same content data in synchronization among respective devices in the content reproduction system, the user positioned in the vicinity of the reference device hears audio outputted from other devices in the out-of-sync state, which may give uncomfortable feeling to the user. Moreover, probability of giving uncomfortable feeling to the user is further increased when the volume of audio outputted from other devices is high.

Here, as measures for preventing the content reproduction system from giving uncomfortable feeling to the user, it is possible to cite, for example, a measure of reducing reproduction volume in other devices or a measure of setting the reproduction volume to low in advance. However, to take the above measures forces the user to perform adjustment operation of the reproduction volume as well as imposes limitations on the reproduction of content data in the content reproduction system, which may reduce user-friendliness.

Furthermore, the related-art technique dynamically adjusts the sweet spot of the sound field in the multichannel audio system as described above, therefore, the reproduction of content data indicating the same content in synchronization among plural devices as in the content reproduction system is not assumed in the related-art technique. Accordingly, it is difficult to prevent giving uncomfortable feeling to the user due to the delay of audio outputted by reproduction of content data, which may occur in the content reproduction system even by using the related-art technique.

In view of the above, it is desirable to provide a novel and improved transmission device and a transmission method capable of providing listening experience more suitable for the user who listens to audio corresponding to reproduction of content data in the content reproduction system in which content data is reproduced in synchronization among plural devices.

According to an embodiment of the invention, there is provided a transmission device including a communication unit performing communication with one or more receiving devices, a distance measurement unit measuring direct distances to the respective receiving devices, a transmission data setting unit setting transmission data including content data including audio to be transmitted and time information indicating the time when reproduction of content data is started with respect to the respective receiving devices distances of which are measured based on the measured distances to the respective receiving devices and a transmission processing unit transmitting transmission data set by the transmission data setting unit to corresponding receiving devices of transmission targets all at once, in which the transmission data setting unit sets the time when the device itself starts reproduction of the content data as a reference time, and sets the time information for synchronizing audio indicated by the content data reproduced in the device itself with audio indicated by the content data reproduced in the receiving devices with respect to each receiving device using the set reference time as a reference.

According to the above configuration, it is possible to realize the content reproduction system capable of providing listening experience more suitable for the user who listens to audio corresponding to reproduction of content data.

When the communication unit receives an adjustment signal for changing the device to be the reference of the time when the reproduction of content data is started, the transmission data setting unit may set the time when the receiving device which has transmitted the adjustment signal starts reproduction of content data as a reference time, and may set time when the device itself starts reproduction of the content data and the time information with respect to the respective devices using the reference time set based on the adjustment signal as a reference.

It is also preferable to further include a storage unit storing at least one or more pieces of reproduction control information defining adjustment time adjusting a time interval between the reference time and the time when reproduction of the content data is started by being associated with the direct distance to the receiving device, in which the transmission data setting unit sets the time information by reflecting the adjustment time based on the measured distances to the respective receiving devices and the selected reproduction control information.

The distance measurement unit may transmit a measuring signal for measuring distances to the respective receiving devices to measure distances based on a time interval between the time when the measurement signal is transmitted and the time when a response signal transmitted from the receiving device receiving the measurement signal is received.

The distance measurement unit may also transmit a measuring signal for measuring distances to the respective receiving devices to measure distances based on a time interval between the time when the measurement signal is transmitted and the time indicated by information of the time when the measurement signal is received in the receiving device included in the response signal transmitted from the receiving device receiving the measurement signal.

It is also preferable to further include a reproduction processing unit reproducing the content data based on the time when the device itself starts reproduction of the content data set by the transmission data setting unit.

According to another embodiment of the invention, there is provided a transmission method including the steps of measuring direct distances from a transmission device transmitting transmission data including content data including audio to be transmitted and time information indicating the time when reproduction of the content data is started to the respective receiving devices of transmission targets of the transmission data, setting transmission data in which the time information is set based on distances to the respective receiving devices measured in the step of measuring distances with respect to the respective receiving devices, and transmitting transmission data set in the step of setting data to corresponding receiving devices of transmission targets all at once, in which, in the step of setting transmission data, the time when the transmission device starts reproduction of the content data is set as a reference time and the time information for synchronizing audio indicated by the content data reproduced in the transmission device with audio indicated by the content data reproduced in the receiving devices with respect to the respective receiving devices of transmission targets using the set reference time as a reference.

The content reproduction system capable of providing listening experience more suitable for the user who listens to audio corresponding to reproduction of content data can be realized by using the above method.

According to the embodiments of the invention, listening experience more suitable for the user who listens to audio corresponding to reproduction of content data can be provided in the content reproduction system in which content data is reproduced in synchronization among plural devices.

BRIEF DESCRIPTION OF THE DRAWINGS

FIG. 4 is an explanatory chart showing an example of a format of transmission data transmitted by a transmission device according to the embodiment of the invention;

DESCRIPTION OF THE PREFERRED EMBODIMENT

Hereinafter, a preferred embodiment of the invention will be explained in detail with reference to the attached drawings.

In the present specification and the drawings, the same numerals and signs are given to components having substantially the same functional configurations to thereby omit repeated explanation.

The explanation will be made in the following order.

1. Approach according to an embodiment of the invention
2. Content reproduction system according to the embodiment of the invention
3. Program according to the embodiment of the invention (Approach According to an Embodiment of the Invention)

A data transmission approach according to an embodiment of the invention for providing listening experience more suitable for a user will be explained before explaining configurations of respective devices included in a content reproduction system (hereinafter may be referred to as a "content reproduction system 1000") according to the embodiment of the invention.

[Outline of the Content Reproduction System 1000]

Figure 1:
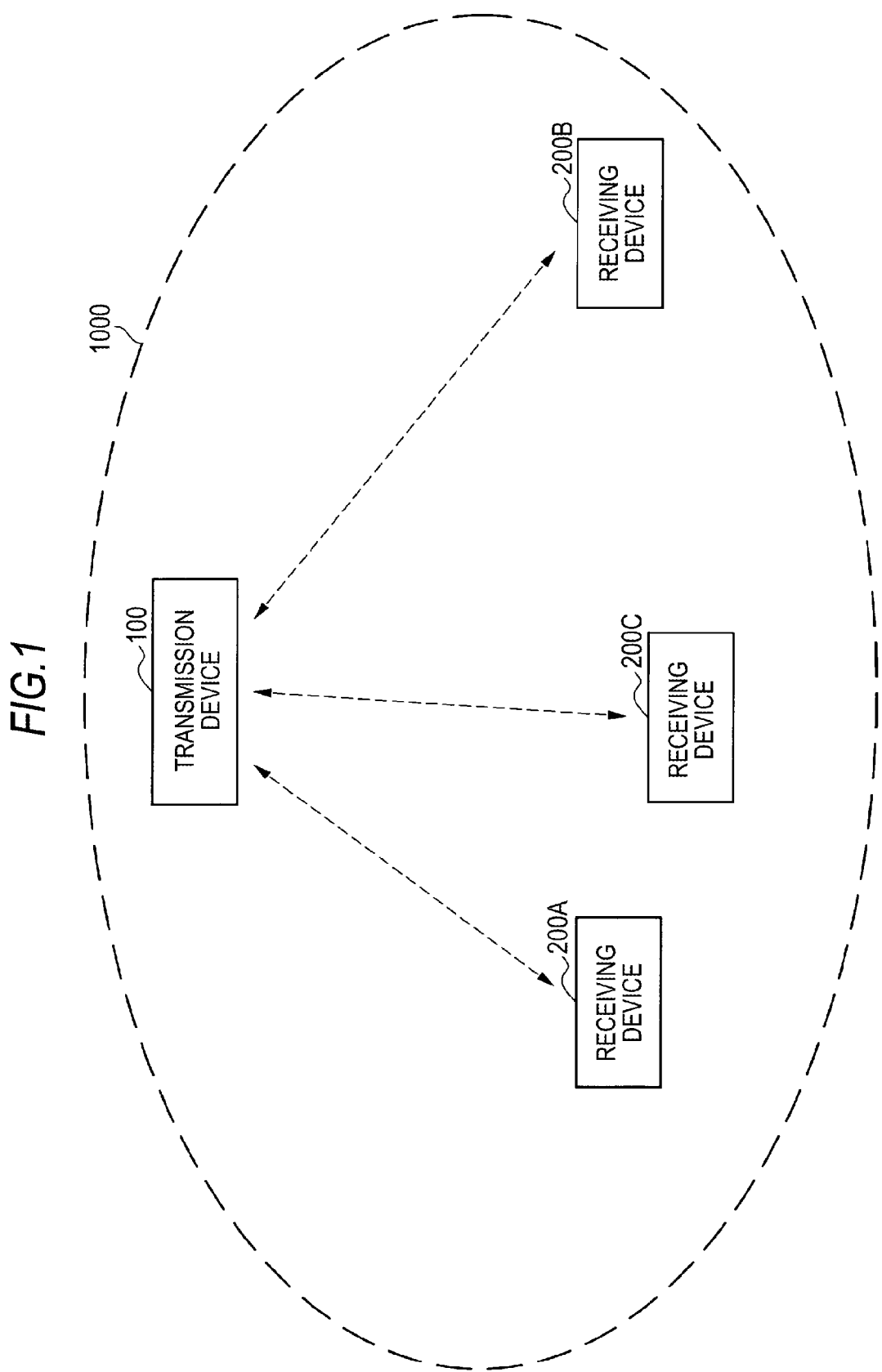
FIG. 1 is an explanatory view showing the outline of a content reproduction system according to the embodiment of the invention.

An outline of the content reproduction system 1000 will be explained before explaining an outline of the later-described data transmission approach according to the embodiment of the invention. FIG. 1 is an explanatory view showing the outline of the content reproduction system 1000 according to the embodiment of the invention. The content reproduction system 1000 includes a transmission device 100, receiving devices 200A, 200B, . . . , (hereinafter may be generically referred to as a "receiving devices 200"). In FIG. 1, a configuration in which the content reproduction system 1000 includes three receiving devices 200 is shown, however, the number of the receiving devices 200 included in the content reproduction system 1000 is not limited to the example shown in FIG. 1.

The transmission device 100 performs communication with the receiving devices 200 through wired communication using, for example, a LAN (Local Area Network) and the like or wireless communication using IEEE802.11g, IEEE802.15.1 and so on. Here, a case where the transmission device 100 performs communication with the receiving devices 200 through the wireless communication is shown in FIG. 1. For example, when IEEE802.11g is used as the wireless communication, not shown in FIG. 1, the transmission device 100 performs communication with the receiving devices 200 through an intermediary device (hereinafter referred to as an "intermediary device 300") functioning as an access point.

In the content reproduction system, for example, various requests (commands) such as a communication request (described later) and a re-transmission request of transmission data, a measurement signal (described later), transmission data (described later) and so on are transmitted/received by using, for example, "UDP unicast packets". The content reproduction system 1000 according to the embodiment of the invention can perform transmission/reception of various requests and the like, for example, in an arbitrary format complying with the DLNA standard.

The content reproduction system 1000 according to the embodiment of the invention is configured by transmitting a communication request to the respective receiving devices 200 which can be transmission targets of the transmission data by the transmission device 100 and by making a response of performing communication with respect to the communication request by respective receiving devices 200. That is, the content reproduction system 1000 is configured by requesting respective receiving devices 200 to enter into the system by the transmission device 100 and by accepting the request by respective receiving devices 200.

Hereinafter, outlines of the transmission device 100 and the receiving devices 200 will be explained by taking the content reproduction system 1000 shown in FIG. 1 as an example. When the receiving device 200A shown in FIG. 1 transmits the communication request to the transmission device 100 or other receiving devices 200, the receiving device 200A shown in FIG. 1 may function as the transmission device and the transmission device 100 shown in FIG. 1 may function as the receiving device.

The transmission device 100 has a function of transmitting transmission data to the respective receiving devices 200 of transmission targets of the transmission data (hereinafter may be referred to as "transmission target devices") in the content reproduction system 1000. More specifically, the transmission device 100 sets the transmission data to be transmitted to the respective transmission target devices with respect to each transmission target device. Then, the transmission device 100 transmits the set transmission data to be transmitted to the respective transmission target devices all at once. Here, to transmit transmission data all at once by the transmission device 100 according to the embodiment of the invention means that, for example, transmission data corresponding to the respective transmission target devices is "transmitted all at once" or "sequentially transmitted" to the respective transmission target devices by the transmission device 100.

Here, transmission data according to the embodiment of the invention is data including content data and time information indicating the time when reproduction of the content data is started. Additionally, content data according to the embodiment of the invention is, for example, data including audio indicating contents of audio, images and so on such as audio data indicating audio (including music, which is the same in the following description) and video data indicating audio and images (still images/moving images). A case where the transmission data transmitted from the transmission device 100 to the receiving devices 200 of transmission targets is audio data will be explained below with an example. Also in the following description, time information according to the embodiment of the invention may be referred to as a "time stamp".

The transmission device 100 sets reproduction start time at which reproduction of content data indicating the same content as content data transmitted to the respective receiving devices 200 is started. Then, the transmission device 100 reproduces the content data at the set reproduction start time. When the transmission device 100 does not have the function of reproducing content data and is connected to an external device (external reproduction device) having the reproduction function, the transmission device 100 allows the external device to reproduce the content data.

As the given reproduction start time set by the transmission device 100, a time point when a prescribed time (for example, actual processing time necessary for performing synchronized reproduction) has passed after the operation relating to reproduction of content data by the user of the transmission device 100 can be applied. The transmission device 100 also sets time information with respect to each receiving device 200 of transmission targets by taking the set reproduction start time (the time when the device itself starts reproduction of content data) as a reference. The method of setting the reproduction start time in the transmission device 100 and the time information with respect to each receiving device 200 is not limited to the above. For example, the transmission device 100 may set the reproduction start time in the transmission device 100 and the time information in other receiving devices 200 by taking the time when one receiving device 200 in the receiving devices 200 of transmission targets starts reproduction of content data as a reference. In the following description, the reproduction start time of content data in one device included in the content reproduction system 1000 is referred to as a "reference time", which will be the reference in the setting of the reproduction start time of the transmission device 100 and time information of respective receiving devices 200.

The receiving device 200 receives transmission data transmitted from the transmission device 100 and reproduces content data included in the transmission data at the time defined by the time information included the received transmission data. More specifically, for example, the receiving device 200 stores the received transmission data in a recording medium such as a buffer memory (not shown), reproducing content data included in the transmission data stored in the recording medium at the time defined by the time information.

As described above, the transmission device 100 sets the time when the device itself starts reproduction of content data as well as sets transmission data including time information with respect to each receiving device 200 of transmission target in the content reproduction system 1000. Then, the transmission device 100 transmits the set transmission data to corresponding receiving devices 200 all at once. Also in the content reproduction system 1000, the receiving device 200 receiving the transmission data reproduces content data included in the transmission data at the time defined by time information included in the received transmission data. Accordingly, respective devices included in the content reproduction system 1000 start reproduction of content data indicating the same content at the given time set by the transmission device 100. Therefore, the content reproduction system 1000 can reproduce content data in synchronization among the transmission device 100 and respective receiving devices 200 of transmission targets of transmission data by including the above transmission device 100 and the receiving devices 200.

[Outline of the Data Transmission Approach]

Figure 2:
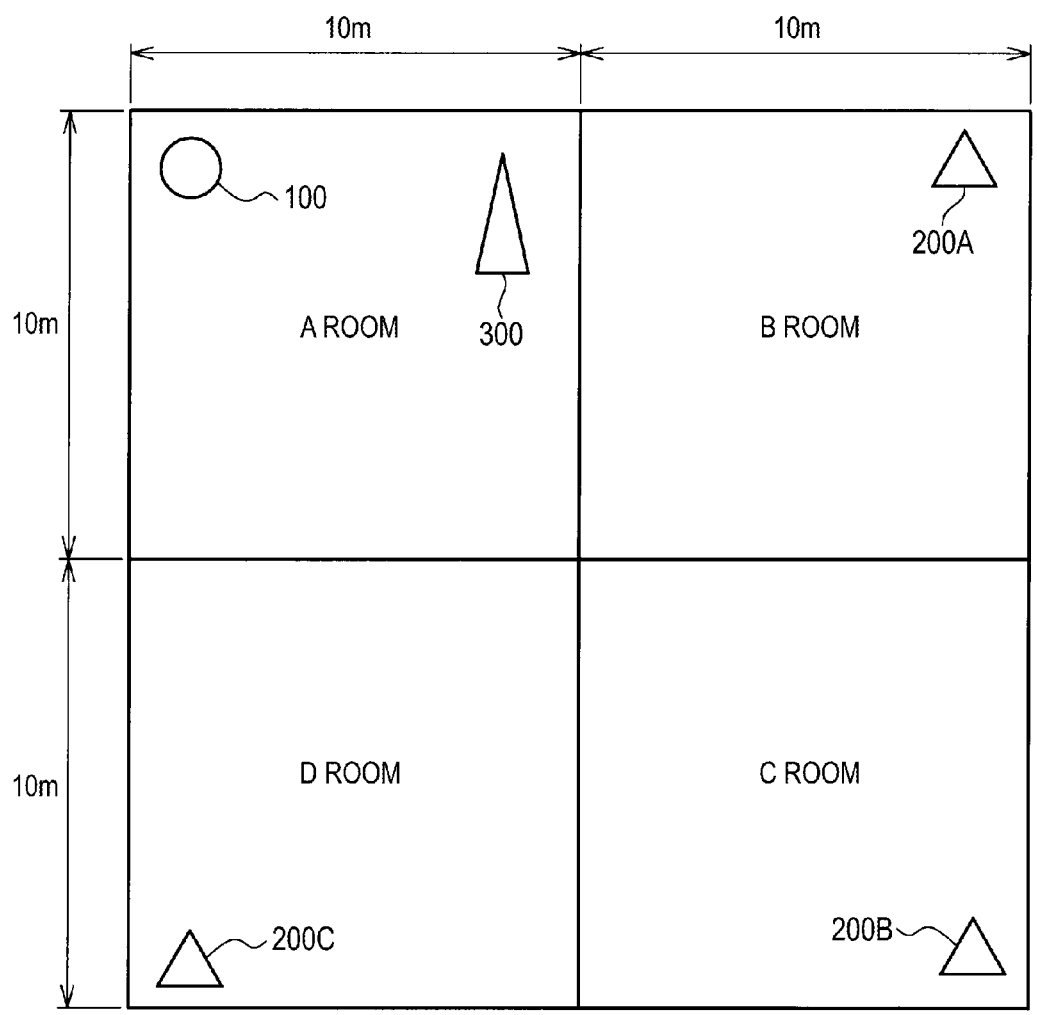
FIG. 2 is an explanatory view for explaining a data transmission approach according to the embodiment of the invention.

Next, the data transmission approach according to the embodiment of the invention for providing listening experience more suitable for the user will be explained. FIG. 2 is an explanatory view for explaining the data transmission approach according to the embodiment of the invention, which shows an application example of the content reproduction system 1000 shown in FIG. 1. Here, FIG. 2 shows an example in which the transmission device 100 and the intermediary device 300 are set in a room A (or space, which is the same in the following description), and the receiving devices 200A, 200B and 200C are set in a room B, a room C and a room D, respectively. Hereinafter, the case where respective devices included in the content reproduction system 1000 are arranged in a manner shown in FIG. 2 will be explained as an example. The content reproduction system 1000 according to the embodiment of the invention is not limited to the configuration in which respective devices are set in plural rooms as shown in FIG. 2. For example, the content reproduction system 1000 according to the embodiment of the invention may have a configuration in which respective devices are set in one room (for example, a case in which the rooms A to D shown in FIG. 2 are included in one room).

When the distance between devices included in the content reproduction system in which content data is reproduced in synchronization among plural devices is, for example, 20 [m] as shown in FIG. 2, audio corresponding to content data outputted from other devices is heard with a delay of approximately 60 [msec] at a position of one device. Accordingly, a lag (unintentional lag) due to delay occurs in audio outputted from respective devices in the content reproduction system, which may give uncomfortable feeling to the user as described above.

In view of the above, in the content reproduction system 1000 according to the embodiment of the invention, the transmission device 100 transmits transmission data including time information in which audio delay corresponding to the distance between the transmission device 100 and each receiving device 200 is taken into account to each receiving device 200. The receiving device 200 receiving the transmission data reproduces content data included in the transmission data at the time defined by time information included in the received transmission data as described above. Therefore, the unintentional lag due to audio delay does not occur at the given position where more suitable listening experience is provided to the user by transmitting the transmission data including time information in which audio delay corresponding to the distance is taken into account.

It is necessary to consider effects of transmission delay when respective devices are connected by wireless communication as transmission data transmitted from the transmission device 100 is received by the receiving devices 200 in the content reproduction system 1000. However, transmission speed in wireless communication is approximately 300,000, 000 [m/sec], therefore, transmission delay is 0.0000333 [msec] when the distance between devices is approximately 10 [m]. As the transmission delay is sufficiently smaller than audio delay, the transmission delay can be ignored in the content reproduction system 1000. Also when respective devices are connected by wire, the transmission delay is sufficiently smaller than the audio delay, therefore, the transmission delay can be ignored in the content reproduction system 1000.

Accordingly, the transmission device 100 transmits the transmission data including time information in which audio delay corresponding to the distance is taken into account to thereby realize the content reproduction system 1000 capable of providing listening experience more suitable for the user who listens to audio corresponding to reproduction of content data.

More specifically, in the content reproduction system 1000 according to the embodiment of the invention, the transmission device 100 performs the following processing (1) to processing (3) to thereby realize the content reproduction system capable of providing listening experience more suitable for the user who listens to audio corresponding to reproduction of content data. Here, the processing (1) to processing (3) shown below is an example of processing relating to the transmission method according to the embodiment of the invention.

(1) Distance Measurement Processing

The transmission device 100 measures direct distances to the respective receiving devices 200 of transmission targets. Here, the direct distance according to the embodiment of the invention indicates a straight-line distance between the transmission device 100 and each of respective receiving devices 200A, 200B and 200C in FIG. 2, which is distinguished from the distance (indirect distance) of a communication path through the intermediary device 300. Hereinafter, the direct distance according to the embodiment of the invention may be referred to as merely a "distance". The distance measurement processing in the transmission device 100 according to the embodiment of the invention can be taken as processing estimating direct distances to the respective receiving devices 200 of the transmission targets.

[An Example of Distance Measurement Processing]

The transmission device 100 measures, for example, reciprocating time of communication between the transmission device 100 and each receiving device 200 and calculates the direct distance based on the measured reciprocating time and radio wave speed (rated value).

The transmission device 100 transmits a measurement signal for measuring distances to the respective receiving devices and measures a time interval between the time when the measurement signal is transmitted and the time when a response signal transmitted from the receiving device 200 receiving the measurement signal is received. Then, the transmission device 100 calculates the direct distance based on the measured time interval and the radio wave speed. The first distance measurement method according to the embodiment of the invention has the same scheme as a radar. However, the radar detects an object by detecting a reflected wave from the object with respect to a transmission wave transmitted from the transmission side, which is different from the first distance measurement method according to the embodiment of the invention in a point that the signal transmitted by the receiving device 200 of the transmission target is used.

As the measurement signal according to the embodiment of the invention, for example, a signal encoded with respect to each receiving device by a PN series is cited. Also as the response signal according to the embodiment of the invention, for example, the measurement signal itself normally received by the receiving device 200 is cited. The transmission device 100 can distinguish plural receiving devices 200 by changing a coding series used with respect to each receiving device 200 by using, for example, the PN series.

As a method of measuring time in the transmission device 100, for example, a method of counting time from a transmission time point of the measuring signal to the reception of the response signal by using a reference processing clock (CLK) in the transmission device 100, a method of using an absolute time stamp based on NTP (Network Time Protocol) and so on can be cited. For example, NTPv.4 (RFC 4330, RFC 1305) establishment of which is currently proceeding uses the time notation having a real part of 64-bit and a decimal-point part of 64-bit, therefore, the method has sufficient resolution for distance measurement when using the time stamp based on NTRv. 4.

The accuracy of measurement in the distance measurement processing according to the embodiment of the invention is determined by a clock frequency at which the measurement signal is processed. For example, when using a clock of 300[MHz], the direct distance can be measured with the accuracy of a distance within 1 [m]. The transmission device 100 can perform measurement with higher accuracy by increasing the clock frequency used for the distance measurement processing. Moreover, delays other than the transmission delay in the distance measurement processing such as delay which may occur in hardware (for example, a communication module) relating to the distance measurement processing are corrected as well-known delays, thereby reducing effects of the delays (namely, the measurement accuracy is improved). More specifically, the transmission device 100 can improve the measurement accuracy by correcting delays other than the transmission delay by measuring transmission/reception time of the signal in a physical layer of communication or previously compensating delay time in the communication module. As the transmission delay in the distance measurement processing is sufficiently small as described above, the transmission delay does not give effects on the measurement accuracy when ignored.

The transmission device 100 may include, for example, a dedicated module for distance measurement to transmit the measurement signal or receive the response signal according to the distance measurement processing by using the dedicated module, however, the configuration of the transmission device 100 is not limited to the above. For example, the transmission device 100 also can transmit the measurement signal or receive the response signal relating to the distance measurement processing by using a P2P (Pear to Pear) communication (for example, Wi-Fi Direct, etc.) and so on using communication modules complying with an IEEE802.11 series, a IEEE802.15.1 and the like.

The transmission device 100 measures distances to the respective receiving devices 200 by performing, for example, the above processing.

The distance measurement processing in the transmission device 100 according to the embodiment of the invention is not limited to the above. For example, the transmission device 100 may measure time until the transmitted signal is received in respective receiving devices 200 and calculate direct distances based on the measured time and radio wave speed.

More specifically, the transmission device 100 transmits the measurement signal to each receiving device 200 and measures the distance based on the time interval between the time when the measurement signal is transmitted and the time indicated by information of the time when the measurement signal is received in the receiving device 200, which is included in the response signal transmitted from the receiving device receiving the measurement signal. In the above case, the transmission device 100 measures one-way time of communication, but the reciprocating time of communication can be calculated from the measured one-way time of communication. Therefore, the transmission device 100 can measure distances to the respective receiving devices 200 also in the above case.

The transmission device 100 can also transmit a measurement signal having directivity to the respective receiving devices 200. When the measurement signal having directivity is transmitted to the respective receiving devices 200, the transmission device 100 can recognize not only distances to the respective receiving devices 200 but also directions in which respective receiving devices 200 exist. Therefore, the transmission device 100 transmits the measurement signal having directivity to the respective receiving devices 200, thereby measuring (estimating) distances from the transmission device 100 to the respective receiving devices 200 as well as distances among respective receiving devices 200 included in the content reproduction system 1000.

The measurement (estimation) of distances to the respective receiving devices 200 being performed by the transmission device 100 has been described above. However, the method of measuring (estimating) distances from the transmission device 100 to the respective receiving devices 200 in the content reproduction system 1000 according to the embodiment of the invention is not limited to the measurement (estimation) of distances to the respective receiving device 200 by the transmission device 100. For example, it is also possible that the receiving devices 200 estimate distances to the transmission device 100 based on field effect intensity of the received measurement signal. When using the above method, the transmission device 100 receives response signals showing estimated results of distances from respective receiving devices 200, thereby recognizing distances to the respective receiving devices 200.

When using the above method, if the distance between the transmission device 100 and the receiving device 200 is close, for example, there is a danger that an amplifier included in the receiving device 200 is saturated. Therefore, when using the above method, it is desirable to transmit the measurement signal with electric power lower than signals normally transmitted by the transmission device 100. According to the above, the transmission device 100 can prevent the amplifier of the receiving device 200 from being saturated.

When using the above method, if there is a wall between the transmission device 100 and the receiving device 200 or if there exists one or more human beings, electric field intensity detected in the receiving device 200 is attenuated. Consequently, the accuracy of estimating the distance is reduced in the above case. Accordingly, when using the above method, for example, respective receiving devices 200 store adjusted values corresponding to types of the wall between the transmission device 100 and the receiving device 200 (for example, the thickness, materials, existence of a tinfoil insulator and the like) or the number of walls as preset values to use the preset values. According to the above, it is possible to prevent the reduction of estimation accuracy of the distance in respective receiving devices 200. Moreover, when using the above method, the transmission device 100 and the receiving device 200 perform transmission/reception of a measurement signal using a diversity antenna or perform transmission/reception of the measurement signal plural times to take an average value, thereby preventing the reduction in accuracy of estimating the distance.

(2) Transmission Data Setting Processing

The transmission device 100 sets transmission data with respect to each receiving device 200 of the transmission target based on distances to the respective receiving devices 200 measured in the processing of (1) (distance measurement processing).

More specifically, the transmission device 100 sets the time when the device itself starts reproduction of content data as a reference time (when the transmission device 100 is determined as the reference device). Then, the transmission device 100 sets time information in which delay times corresponding to distances to the receiving devices 200 measured in the processing of (1) (distant measurement processing) are taken into account based on the set reference time with respect to each receiving device 200. For example, when the measured distance to the receiving device 200A is 20 [m], the transmission device 100 sets time 60 [msec] earlier than the reference time in the time information corresponding to the receiving device 200. As the transmission device 100 sets time information in which delay times corresponding to the measured distances are taken into account with respect to each receiving device 200 as described above, the transmission device 100 can prevent occurrence of the unintentional lag in audio indicated by content data reproduced in the transmission device 100 at the position of the device itself and audio indicated by content data reproduced in the receiving devices 200.

Hereinafter, audio indicated by content data reproduced in the transmission device 100 and audio indicated by content data reproduced in the receiving devices 200 may be generically referred to as "audio outputted from respective devices in the content reproduction system 1000". Additionally, "to prevent occurrence of a lag due to delay of audio outputted from respective devices of the content reproduction system 1000 at the position of the reference device" may be referred to as "to allow audio outputted from respective devices in the content reproduction system 1000 to be synchronized at the position of the reference device" in the following description.

The processing of (2) in the transmission device 100 is not limited to the setting of the time when the device itself starts reproduction of content data as the reference time. For example, the transmission device 100 may set the time when any one of the receiving devices 200 included in the content reproduction system 1000 starts reproduction of content data as the reference time. That is, the transmission device 100 may use any one of the receiving devices 200 as the reference device to synchronize audio outputted from respective devices in the content reproduction system 1000 at the position of the receiving device 200.

More specifically, when the transmission device 100 receives, for example, an adjustment signal transmitted from the receiving device 200, the transmission device 100 sets the time when the receiving device 200 which has transmitted the adjustment signal starts reproduction of content data as the reference time. Then, the transmission device 100 sets the time when the device itself starts reproduction of content data and times when the respective devices 200 other than the receiving device 200 as the reference device start reproduction of content data respectively by using the reference time set based on the adjustment signal as a reference. That is, the adjustment signal according to the embodiment is a signal functioning as a trigger for changing the device to be a reference of time when reproduction of content data is started.

Here, the transmission device 100 can measure (estimate) distances from the transmission device 100 to the receiving devices 200 as well as distances among respective receiving devices 200 by the above processing of (1) (distance measurement processing). Accordingly, the transmission device 100 can set times when respective devices start reproduction of content data so that audio outputted from respective devices in the content reproduction system 1000 is synchronized with one another at the position of the receiving device 200 which has transmitted the adjustment signal. That is, the transmission device 100 can set time information in which delay times are taken into account with respect to each receiving device 200 even when setting the time when any of the receiving device 200 starts reproduction of content data as the reference time.

The transmission device 100 can synchronize audio outputted from respective devices in the content reproduction system 1000 with one another at the position of the given receiving device 200 functioning as the reference device by setting time information in which delay times corresponding to distances measured as described above are taken into account with respect to each receiving device 200 by the transmission device 100.

The transmission device 100 sets time information in which delay time corresponding to distances measured in the processing of (1) (distance measurement processing) is taken into account with respect to each receiving device 200 as described above as well as sets transmission data including the set time information and content data to be transmitted with respect to each receiving device 200. The transmission device 100 also transmits transmission data set in the processing of (2) to the receiving devices 200 in processing of (3). Therefore, the transmission device 100 can synchronize audio outputted from respective devices in the content reproduction system 1000 at the position of the reference device.

The processing of (2) in the transmission device 100 is not limited to the setting of time information with respect to each receiving device 200 so that audio outputted from respective devices in the content reproduction system 1000 synchronizes with one another at the position of the reference device. For example, the transmission device 100 can set time information with respect to each receiving device 200 so that audio outputted from respective devices in the content reproduction system 1000 is intentionally lagged at the position of the reference device by adjusting time information with respect to each receiving device 200. Here, the transmission device 100 generates intentional lags in the audio outputted from respective devices in the content reproduction system 1000 to create a pseudo-surround effect such as the multichannel audio system by adjusting time information with respect to each receiving device 200. Therefore, the transmission device 100 can provide listening experience more suitable for the user who listens to audio corresponding to reproduction of content data.

More specifically, the transmission device 100 stores at least one or more reproduction control information, for example, in which adjustment time for adjusting a time interval between the set reference time and the time when reproduction of content data is started in each device is defined. Here, the transmission device 100 may store one or more pieces of reproduction control information as a reproduction control information database. Then, the transmission device 100 sets time information with respect to each receiving device 200, in which the delay time corresponding to the distance measured in the processing of (1) (distance measurement processing) and the adjustment time shown by reproduction control information selected from the stored reproduction control information are taken into account (time information on which the adjustment time is reflected). The transmission device 100 also sets the time when the device itself starts reproduction of content data based on the adjustment time indicated by the reproduction control information selected from the stored reproduction information.

Here, for example, in a concert hall and so on, audio (direct sound) generated from a sound source reaches audience, then, sometimes reaches the audience with a delay of approximately several dozen milliseconds after reflected at a ceiling or a wall just once, which is called "early reflection". There is the possibility that the unintentional lag due to audio delay gives uncomfortable feeling to the user as described above, however, the audio lag does not always give uncomfortable feeling to the user as in the above-described early reflection. That is, the transmission device 100 sets reproduction start time of content data in the device itself and respective receiving devices 200 so that the intentional lag is generated in audio outputted from respective devices in the content reproduction system 1000, thereby giving the user emotional feeling as if in the concert hall.

The transmission device 100 can provide listening experience corresponding to the taste of the user by storing reproduction control information in which adjustment times assumed to be used at various places such as the concert hall are respectively defined and by using reproduction control information selected based on a user operation. Here, citing the content reproduction system 1000 shown in FIG. 2 as an example, for example, audio outputted by the receiving device 200A is delayed by 5 [msec], audio outputted by the receiving device 200B is delayed by 7 [msec] and audio outputted by the receiving device 200C by 12 [msec] respectively as the adjustment times defined by reproduction control information.

The reproduction control information according to the embodiment of the invention is not limited to information for defining adjustment time. For example, the reproduction control information according to the embodiment of the invention may define adjustment time and sound volume. When the reproduction control information defines adjustment time and volume, the transmission device 100 can control not only audio delay outputted by respective devices but also volume of the audio, thereby providing listening experience more suitable for the user who listens to audio corresponding to reproduction of content data.

Here, the reproduction control information according to the embodiment of the invention is recorded in the transmission device 100, for example, at the time of manufacturing the transmission device 100 (so-called preset), however, the method of storing reproduction control information in the transmission device 100 is not limited to the above. For example, the transmission device 100 may store reproduction control information by appropriately acquiring the information from an external apparatus such as a server. As options for the user are further increased when plural reproduction control information is stored in the transmission device 100, it is possible to provide listening experience more suitable for the user (for example, to entertain the user more).

(3) Transmission Processing

The transmission device 100 transmits transmission data set with respect to the respective receiving devices 200 of transmission targets to corresponding receiving devices 200 all at once in the processing of (2) (transmission data setting processing).

In the content reproduction system 1000, the transmission device 100 performs the processing of (1) (distance measurement processing) to the processing of (3) (transmission processing) to thereby transmit transmission data to the receiving devices 200 all at once. Here, the transmission device 100 sets time information in which delay times corresponding to distances measured in the processing of (1) (distant measurement processing) are taken into account with respect to each receiving device 200 to set the transmission data with respect to each receiving device 200 in the processing of (2) (transmission data setting processing). The receiving device 200 reproduces content data included in the transmission data at the time defined by time information included in the received transmission data. Accordingly, in the content reproduction system 1000, the unintentional lag does not occur in audio outputted from respective devices in the content reproduction system 1000 at the position of the reference device. Moreover, the transmission device 100 generates intentional lags in audio outputted from respective devices in the content reproduction system 1000 to thereby create the pseudo-surround effect such as the multichannel audio system.

Therefore, when the transmission device 100 performs the processing of (1) (distance measurement processing) to the processing of (3) (transmission processing), thereby realizing the content reproduction system capable of providing listening experience more suitable for the user who listens to audio corresponding to content data.

[Specific Example of Processing Relating to the Data Transmission Approach]

Next, processing relating to the data transmission approach according to the embodiment of the invention in the content reproduction system 1000 will be explained more specifically. Hereinafter, a case in which the transmission device 100 transmits audio data as transmission data to the receiving devices 200A, 200B and 200C will be explained as an example.

Figure 3:
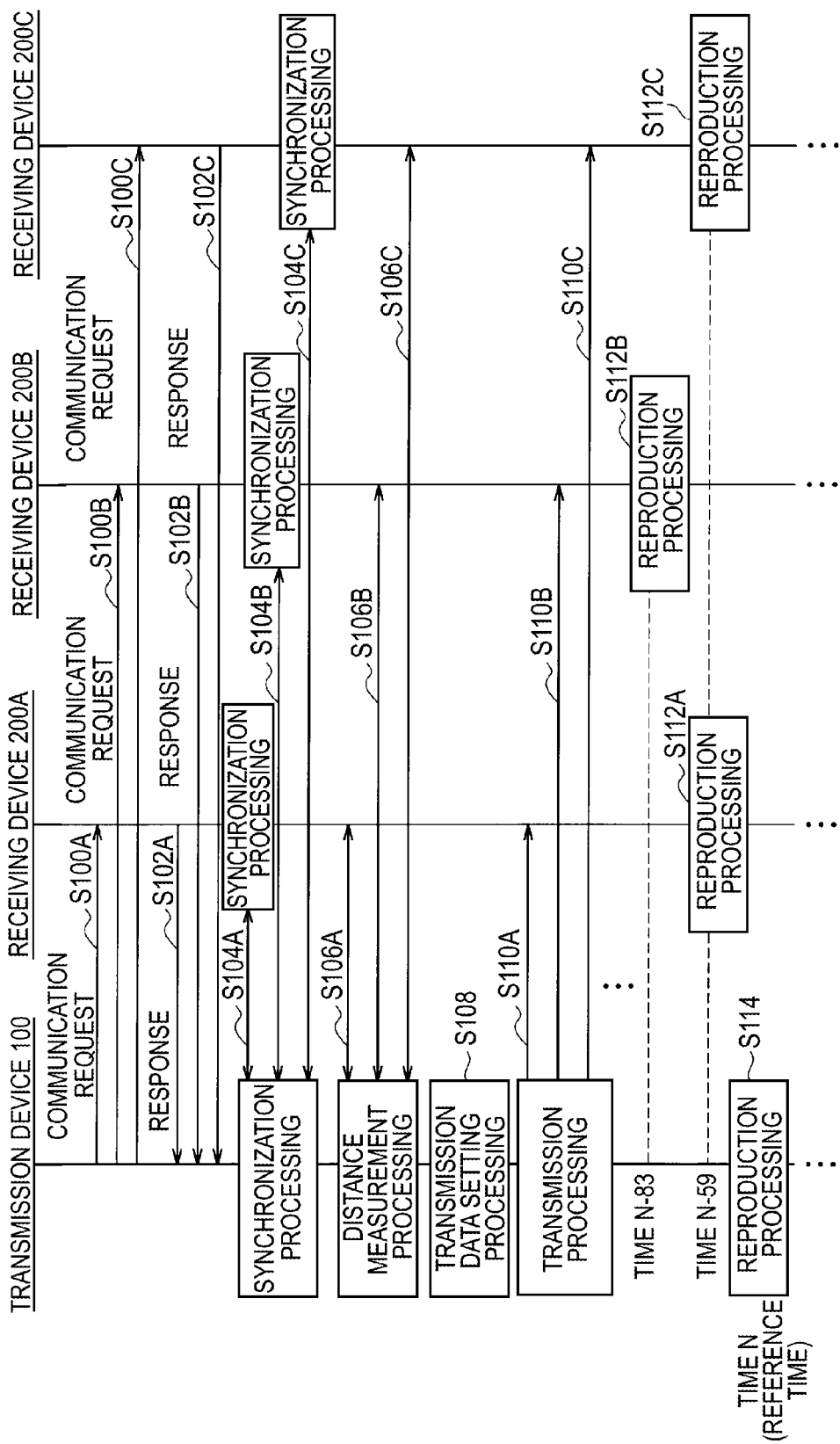
FIG. 3 is an explanatory diagram showing an example of processing relating to the data transmission approach in the content reproduction system according to the embodiment of the invention.

FIG. 3 is an explanatory diagram showing an example of processing relating to data transmission approach in the content reproduction system 1000 according to the embodiment of the invention. Here, FIG. 3 shows an example of processing of synchronizing audio outputted from respective devices in the content reproduction system 1000 with one another at the position of the transmission device 100 by using the transmission device 100 as the reference device.

The transmission device 100 transmits a communication request to the respective receiving devices 200 based on a user operation performed with respect to, for example, an operation unit (later described) (S100A, S100B and S100C, which are generically referred to as "S100" in the following description). Here, the communication request transmitted by the transmission device 100 in Step S100 is, for example, a kind of instruction for instructing respective receiving devices 200 to transmit responses for specifying the receiving devices 200 of transmission targets of transmission data. The communication request according to the embodiment of the invention may be seen as an invitation for participation in the content reproduction system 100, which is transmitted to the respective receiving device 200 from the transmission device 100. That is, the transmission device 100 performs processing of Step S100 and respective receiving device 200 performs later-described processing of Step S102 to thereby form the content reproduction system 1000 as shown in FIG. 1.

The receiving device 200 which has received the communication request transmitted from the transmission device 100 in Step 100 transmits a response to the communication request to the transmission device 100 (S101A, S102B and S102C, which are generically referred to as "S102" in the following description). The transmission device 100 can specify the receiving devices 200 to be the transmission targets of transmission data by receiving the responses transmitted from respective receiving devices 200 in Step S102).

When the receiving devices 200 to be the transmission targets of transmission data are specified after receiving the responses transmitted from respective receiving devices 200 in Step S102, the transmission device 100 performs synchronization processing for transmitting transmission data with respect to the respective receiving devices 200 all at once (S104A, S104B, and S104C, which are generically referred to as "S104" in the following description). Here, as the synchronization processing according to the embodiment of the invention, for example, processing of synchronizing an internal time of the transmission device 100 with an internal time of each receiving device 200 can be cited. More specifically, for example, the transmission device 100 transmits information indicating the internal time of the device itself to the respective receiving devices 200 and each receiving device 200 synchronizes the internal time of the device itself with the time indicated by the received information of the internal time. In the content reproduction system 1000, the transmission device 100 may transmit information indicating the internal time of the device itself in response to a transmission request of information indicating the internal time transmitted from respective receiving devices 200.

Though the example in which the processing of Step S104 is performed after the processing of Step S102 in the content reproduction system 1000 is shown in FIG. 3, the embodiment is not limited to the example. For example, the processing of S104 may be performed at various timings such as after the processing of S106 or after the processing of S108. Additionally, the example in which the processing of Step S104 is performed once in the content reproduction system 1000 is shown in FIG. 3, however, the embodiment is not limited to the example. For example, it is possible to perform the processing of Step S104 plural times in the content reproduction system 1000. The processing of Step S104 may also be performed periodically in the content reproduction system 1000.

The transmission device 100 measures distances to the specified receiving devices 200 of transmission targets (S106A, S106B and S106C, which are generically referred to as "S106" in the following description). Here, the transmission device 100 transmits measurement signals the coding series of which is changed according to the receiving device 200 to the respective receiving devices 200A, 200B and 200C. Then, the transmission device 100 measures distances to the respective receiving devices 200 based on the response signals transmitted from respective receiving devices 200. Here, the transmission device 100 measures distances from the transmission device 100 to the respective receiving devices 200 (or distances from the transmission device 100 to the respective receiving devices 200 as well as distances among respective receiving devices 200) by using various methods shown in the processing of (1) (distance measurement processing).

When distances to the respective receiving devices 200 are measured in Step S106, the transmission device 100 sets transmission data to be transmitted to the respective transmission devices 200 with respect to each receiving device 200 (S108). More specifically, the transmission device 100 sets the time information with respect to each receiving device 200 based on the distances measured in step S106, and sets the transmission data including the set time information and content data to be transmitted with respect to each receiving device 200.

Here, for example, when distances from the transmission device 100 to the receiving devices 200A, 200B and 200C are measured to be 20 [m], 28.28 [m] and 20 [m] respectively in Step S106, transmission times of a sound wave (namely, delay times) are approx. 59[msec], approx. 83[msec] and approx. 59[msec] respectively. The transmission device 100 sets time information of respective receiving devices 200 using delay times corresponding to the measured distances to the receiving devices 200 as offsets. In the above case, in the case where the time when the device itself performs reproduction of content data is determined as the reference time (time N), the transmission device 100 sets "N−59 [msec]", "N−83 [msec]", and N−59 [msec]" as time information to be set with respect to the receiving devices 200A, 200B and 200C respectively.

The transmission device 100 may set "0(zero)" as an offset when, for example, delay time corresponding to the measured distance to the receiving device 200 in Step S106 is a given value or less (or lower than the given value) such as 30 [msec]. That is because the probability of giving uncomfortable feeling to the user is low when the delay time is set to "0 (zero)" under a condition that the distance between the transmission device 100 and the receiving device 200 is sufficiently close. Hereinafter, the case in which "N−59 [msec]", "N−83 [msec]", and N−59 [msec]" are set as time information with respect to the receiving devices 200A, 200B and 200C respectively in Step S106A will be explained as an example.

When transmission data is set in Step S108, the transmission device 100 transmits corresponding transmission data set in Step S108 with respect to the receiving devices 200A, 200B and 200C all at once (S110A, S110B and S110C, which are generically referred to as "S110" in the following description).

FIG. 4 is an explanatory chart showing an example of a format of transmission data transmitted by the transmission device 100 according to the embodiment of the invention. As shown in FIG. 4, the transmission device 100 transmits transmission data including, for example, an identifier, length information, a time stamp (time information) and audio data (an example of content data) in Step S110. Here, the identifier is information for identifying protocols and the length information shows the data length of, for example, the time stamp. It goes without saying that the format of transmission data transmitted by the transmission device 100 according to the embodiment of the invention in Step S110 is not limited to FIG. 4.

The receiving device 200 which has received the transmission data transmitted from the transmission device 100 in Step S110 reproduces content data included in the transmission data at the time defined by time information included in the received transmission data (S112A, S112B and S112C). Here, the transmission device 100 has set "N−59[msec]", "N−83[msec]", and N−59[msec]" as time information to be set with respect to the receiving devices 200A, 200B and 200C in Step S108. Therefore, the receiving device 200B start reproduction of content data at a time N−83[msec] and receiving devices 200A, 200C start reproduction of content data at a time N−59[msec].

The transmission device 100 reproduces content data indicating the same content as content data to be transmitted included in the transmission data at the time N set as the reference time (S114).

In the content reproduction system 1000, for example, the processing shown in FIG. 3 is performed. Here, the transmission device 100 sets transmission data to be transmitted to the respective receiving devices 200 based on distances to the respective receiving devices 200 measured in Step S106, and transmits the set transmission data to corresponding receiving devices 200 all at once. That is, the transmission device 100 performs the processing of (1) (distance measurement processing) to the processing of (3) (transmission processing) to thereby transmit the transmission data to the receiving devices 200 all at once. Accordingly, processing relating to the data transmission approach according the embodiment of the invention is realized in the content reproduction system 1000 by performing for example, the processing shown in FIG. 3.

Therefore, the content reproduction system capable of providing listening experience more suitable for the user who listens to audio corresponding to reproduction of content data by performing, for example, the processing shown in FIG. 3.
(Content Reproduction System According to the Embodiment of the Invention)

Next, examples of configurations of the transmission device 100 and the receiving device 200 included in the content reproduction system 1000 which is capable of realizing processing relating to the data transmission approach according to the embodiment of the invention will be explained.
[Transmission Device 100]

Figure 5:
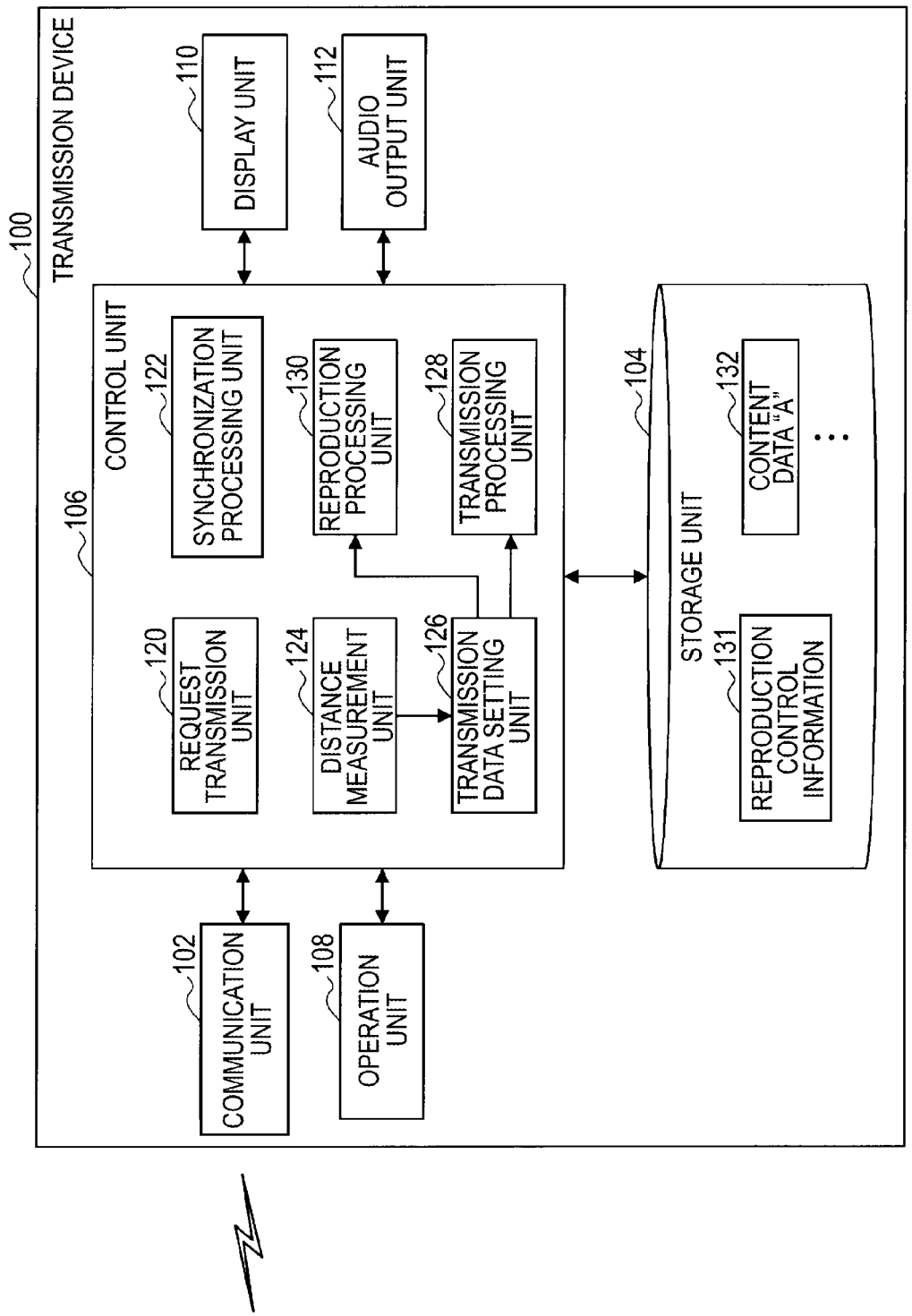
FIG. 5 is a block diagram showing an example of a configuration of the transmission device according to the embodiment of the invention.

FIG. 5 is a block diagram showing an example of a configuration of the transmission device 100 according to the embodiment of the invention. The transmission device 100 includes a communication unit 102, a storage unit 104, a control unit 106, an operation unit 108, a display unit 110 and an audio output unit 112.

The transmission device 100 may also include a ROM (Read Only Memory; not shown), a RAM (Random Access Memory; not shown) and so on. The transmission device 100 connects respective components to one another through, for example, a bus as a data transmission path.

Here, the ROM (not shown) stores data for control such as programs and calculation parameters used by the control unit 106. The RAM (not shown) temporarily stores programs and the like executed by the control unit 106. The RAM (not shown) can functions as a buffer.
[Hardware Configuration Example of the Transmission Device 100]

Figure 6:
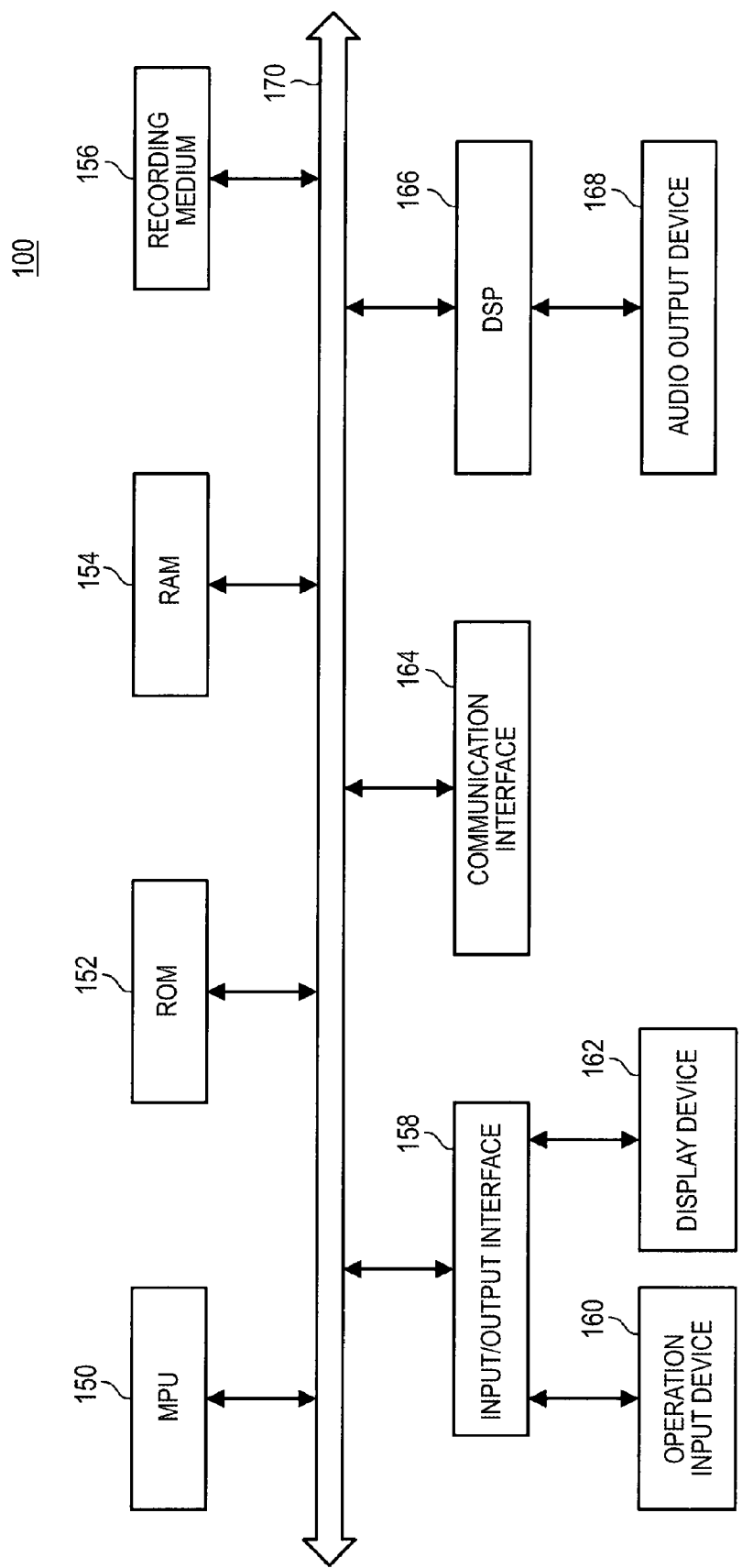
FIG. 6 is an explanatory diagram showing an example of a hardware configuration of the transmission device according to the embodiment of the invention.

FIG. 6 is an explanatory diagram showing an example of a hardware configuration of the transmission device 100 according to the embodiment of the invention. Referring FIG. 6, the transmission device 100 includes, for example, a MPU 150, a ROM 152, a RAM 154, a recording medium 156, an input/output interface 158, an operational input device 160, a display device 162, a communication interface 164, a DSP 166 and an audio output device 168. The transmission device 100 connects respective components to one another through a bus 170 as the data transmission path.

The MPU 150 includes a MPU (Micro Processing Unit), an integrated circuit in which plural circuits for realizing control functions are integrated and so on, which functions as the control unit 106 controlling the entire transmission device 100. The MPU 150 can also function as a later-described request transmission unit 120, a synchronization processing unit 122, a distance measurement unit 124, a transmission data setting unit 126, a transmission processing unit 128, a reproduction processing unit 130 in the transmission device 100.

The ROM 152 stores data for control such as programs and calculation parameters used by the MPU 150. The RAM 154 temporarily stores programs and the like executed by, for example, the MPU 150. The RAM 154 can also function as a buffer temporarily storing processing results of the MPU and the like.

The recording medium 156 functions as the storage unit 104, storing various data such as reproduction control information, content data and applications. Here, as the recording medium 156, for example, magnetic recording media such as a hard disk, and non-volatile memories such as an EEPROM (Electrically Erasable and Programmable Read Only Memory), a flash memory, a MRAM (Magnetoresistive Random Access Memory), a FeRAM (Ferroelectric Random Access Memory), a PRAM (Phase change Random Access Memory) can be cited. The transmission device 100 may include the recording medium 156 removable from the transmission device 100.

The input/output interface 158 is connected to, for example, the operational input device 160 and the display device 162. The operational input device 160 functions as the operation unit 108, and the display device 162 functions as the display unit 110. Here, as the input/output interface, a USB (Universal Serial Bus) terminal, a DVI (Digital Visual Interface) terminal, an HDIM (High-Definition Multimedia Interface) terminal, various processing circuits can be cited. The operational input device 160 is, for example, provided on the transmission device 100 and is connected to the input/output interface 158 inside the transmission device 100. As the operational input device 160, for example, buttons, direction keys, a rotational selector such as a jog dial, or combinations of the above can be cited. The display device 162 is, for example, provided on the transmission device 100 and is connected to the input/output interface 158 inside the transmission device 100. As the display device 162, for example, a liquid crystal display (LCD), an organic EL (ElectroLuminescence) display (also referred to as an OLED (Organic Light Emitting Diode) display) and the like can be cited. The input/output interface 158 can be of course connected to the operational input device (for example, a keyboard, a mouse and the like) as the external device of the transmission device 100 and to the display device (for example, an external display and the like). The display device 162 may be a device capable of performing display as well as being operated by the user such as a touch screen.

The communication interface 164 is a communication means included in the transmission device 100, functioning as the communication unit 102 for performing communication with external devices such as the receiving devices 200, the server and the like (not shown) by wireless/wired communication through a network (or directly). Here, as the communication interface 164, for example, an IEEE802.11g port and a transmission/reception circuit (wireless communication), an IEEE802.15.1 port and a transmission/reception circuit (wireless communication), a communication antenna and a RF circuit (wireless communication), a LAN terminal and a transmission/reception circuit (wired communication) and the like can be cited. The transmission device 100 may include plural communication interfaces such as a communication interface for performing communication with, for example, the receiving devices 200, a communication interface for performing communication with external devices such as a server (not shown) and the like.

Here, as networks according to the embodiment of the invention, for example, a wired network such as a LAN (Local Area Network), a WAN (Wide Area Network) and the like, a wireless network such as a wireless WAN (WWAN; Wireless Wide Area Network), a wireless MAN (WMAN; Wireless Metropolitan Area Network) and the like, Internet using communication protocols such as TCP/IP (Transmission Control Protocol/Internet Protocol) and so on can be cited.

The DSP 166 functions as the reproduction processing unit 130 reproducing content data stored in the recording medium 156 or content data received by the communication interface 164. The DSP 166 includes a DSP (Digital Signal Processor) and various types of processing circuits, which processes audio data. Additionally, the audio output device 168 functions as the audio output unit 112 outputting audio corresponding to audio data, outputting audio corresponding to audio data processed in the DSP 166. Here, as the audio output device 168, for example, an amplifier, a speaker and the like can be cited.

The transmission device 100 performs processing relating to the data transmission approach according to the embodiment of the invention by the above configuration, for example, shown in FIG. 6. The hardware configuration of the transmission device 100 according to the embodiment of the invention is not limited to the configuration of FIG. 6. For example, the transmission device 100 may function as the reproduction processing unit 130 and include a video processing circuit for processing video data. When the transmission device 100 has a configuration not including the reproduction processing unit 130 and the audio output unit 112, a configuration of not having the DSP 166 and the audio output device 168, or not having the video processing circuit can be applied. The transmission device 100 may include, for example, a dedicated module for distance measurement (not shown) for measuring distances to the respective receiving devices 200 of transmission targets of transmission data.

Components of the transmission device 100 will be explained with reference to FIG. 5 again. The communication unit 102 is a communication means included in the transmission device 100, performing communication with external devices such as the receiving devices 200 or a server (not shown) by wireless/wired communication through a network (or directly). The communication by the communication unit 102 is controlled by, for example, the control unit 106. As the communication unit 102, for example, the IEEE port 802.11g port and the transmission/reception circuit (wireless communication), the LAN terminal and the transmission/reception circuit (wired communication) and so on can be cited. The communication unit 102 may also include the dedicated module for distance measurement for measuring distances to the respective receiving devices 200 of transmission targets of transmission data.

The storage unit 104 is a storage means included in the transmission device 100. Here, as the storage unit 104, for example, magnetic recording media such as a hard disk, non-volatile memories such as a flash memory can be cited.

The storage unit 104 also stores various data, for example, reproduction control information, content data, applications and so on. Here, the case where reproduction control information 131 and content data A 132, . . . are stored in the storage unit 104 is shown.

The control unit 106 includes, for example, a MPU, an integrated circuit in which various types of processing circuits are integrated and the like, having a function of controlling the entire transmission device 100. The control unit 106 includes the request transmission unit 120, the synchronization processing unit 122, the distance measurement unit 124, the transmission data setting unit 126, the transmission processing unit 128 and the reproduction processing unit 130, having a function of mainly performing processing relating to the data transmission approach according to the embodiment of the invention.

The request transmission unit 120 generates various types of requests such as the communication request and allows the communication unit 102 to transmit generated various types of requests.

The synchronization processing unit 122 has a function of performing processing (synchronization processing) of Step S104 of FIG. 3. More specifically, the synchronization processing unit 122 generates, for example, information indicating the internal time of the device itself and allows the communication unit 102 to transmit information indicating the generated internal time of the device itself. When the communication unit 102 receives, for example, the transmission request of information indicating the internal time transmitted from the receiving device 200, the synchronization processing unit 122 allows the communication unit 102 to transmit information indicating the internal time of the device itself to the receiving device 200 which has transmits the transmission request in response to the transmission request.

The distance measurement unit 124 has a function of mainly performing the processing of (1) (distance measurement processing). More specifically, for example, the distance measurement unit 124 allows the communication unit 102 to transmit the measurement signal to measure reciprocating time of communication with respect to the respective receiving devices 200 based on the response signals transmitted from respective receiving devices 200 in response to the transmitted measurement signal, which is received by the communication unit 102. Then, the distance measurement unit 124 measures (estimates) distances to the respective receiving devices 200 by calculating, for example, direct distances based on the measured reciprocating time and radio wave speed.

The distance measurement unit 124 transmits information indicating measured distances to the respective receiving devices 200 to the transmission data measurement unit 126. The processing in the distance measurement unit 124 is not limited to the transmission of information indicating the measured distances to the transmission data setting unit 126. For example, the distance measurement unit 124 may record information indicating the distances set in the RAM 154 and so on. In the above case, the transmission data setting unit 126 reads information indicating the distances stored in the RAM 154 to perform processing.

The transmission data setting unit 126 has a function of mainly performing the processing of (2) (transmission data setting processing). More specifically, the transmission data measurement unit 126 sets the reference time, and sets time information in which delay times corresponding to distances are taken into account with respect to each receiving device 200 based on distances to the respective receiving devices 200 measured by the distance measurement unit 124. The transmission data setting unit 126 also set time information based on the reproduction control information 131 when the operation signal corresponding to a given user operation is transmitted from, for example, the operation unit 108. Then the transmission data setting unit 126 sets transmission data including the set time information and content data to be transmitted with respect to each receiving device 200.

Here, the transmission data setting unit 126 sets content data stored in, for example, the storage unit 104 as content data to be included in transmission data, however, content data to be included in transmission data set by the transmission data setting unit 126 is not limited to the above. For example, the transmission data setting unit 126 can acquire content data stored in external devices such as the server through the communication unit 102 and can set transmission data including the acquired content data. The transmission data setting unit 126 may set transmission data including content data stored in external recording media such as a USB memory and an optical disk.

The transmission data setting unit 126 sets transmission data including content data designated by the user based on a given operation signal corresponding to a user operation transmitted, for example, from the operation unit 108, however, the setting method of transmission data is not limited to the above. For example, the transmission data setting unit 126 also may select arbitrary content data from content data stored in the storage unit 104 or content data stored in the external recording media and may set transmission data including the selected content data.

Furthermore, the transmission data setting unit 126 transmits the set transmission data to, for example, the transmission processing unit 128, however, the processing in the transmission data setting unit 126 is not limited to the transmission of the set transmission data to the transmission processing unit 128. For example, the transmission data setting unit 126 may record transmission data set in the RAM 154 and the like. In the above case, the transmission processing unit 128 reads transmission data stored in the RAM 154 to perform processing.

The transmission data setting unit 126 further sets the time when the device itself starts reproduction of content data indicating the same content as content data to be transmitted included in the transmission data. Here, the transmission data setting unit 126 transmits information indicating the set time when the device itself starts reproduction of content data to the reproduction processing unit 130, however, processing in the transmission data setting unit 126 is not limited to the transmission of the set time information to the reproduction processing unit 130. For example, the transmission data setting unit 126 may record the time information set in the RAM 154 and the like. In the above case, the reproduction processing unit 130 reads the time information stored in the RAM 154 to perform processing.

The transmission processing unit 128 has a function of mainly performing the processing of (3) (transmission processing). More specifically, the transmission processing unit 128 transmits transmission data with respect to the respective receiving devices 200 set by the transmission data setting unit 126 to corresponding receiving devices 200 all at once.

The reproduction processing unit 130 has a function of performing processing of Step S114 of FIG. 3 (reproduction processing). More specifically, the reproduction processing unit 130 starts reproduction of given content data at the time indicated by the time information based on information of the time when the device itself starts reproduction of content data set by the transmission data setting unit 126.

The control unit 106 includes, for example, the request transmission unit 120, the synchronization processing unit 122, the distance measurement unit 124, the transmission data setting unit 126, the transmission processing unit 128 and the reproduction processing unit 130 to thereby realize the processing in the transmission device 100 shown in FIG. 3. Accordingly, the control unit 106 can perform the function of mainly performing processing relating to the data transmission approach according to the embodiment of the invention by the configuration, for example, shown in FIG. 5. The configuration of the control unit 106 included in the transmission device 100 according to the embodiment of the invention is not limited to the configuration of FIG. 5. For example, the control unit 106 according to the embodiment of the invention may be a configuration not including the reproduction processing unit 130 for reproducing content data (for example, in the case where the transmission device 100 does not have the function of reproducing content data).

The operation unit 108 is an operation means included in the transmission device 100 which can be operated by the user. The transmission device 100 includes the operation unit 108 to enables the user to operate the device and can perform processing desired by the user in response to the user operation. Here, as the operation unit 108, for example, buttons, direction keys, a rotational selector such as a jog dial, or combinations of the above can be cited.

The display unit 110 is a display means included in the transmission device 100, displaying various information on a display screen. As screens displayed on the display screen of the display unit 110, for example, an operation screen for allowing the transmission device 100 to perform desired operations, a content reproduction screen corresponding to the reproduction of content data and the like can be cited. Here, as the display unit 110, for example, the LCD, the organic EL display and so on can be cited. The transmission device 100 also forms the display unit 100 by, for example, a touch screen. In the above case, the display unit 100 functions as an operation display unit capable of performing both the user operation and display.

The audio display unit 112 outputs audio corresponding to content data processed by the reproduction processing unit 130. As the audio output unit 112, for example, an amplifier, a speaker and the like can be cited.

The transmission device 100 can realize processing relating to the data transmission approach according to the embodiment of the invention by the configuration shown in FIG. 5. Therefore, the transmission device 100 can realize the content reproduction system capable of providing listening experience more suitable for the user who listens to audio corresponding to reproduction of content data by the configuration shown in FIG. 5. It goes without saying that the configuration of the transmission device 100 according to the embodiment of the invention is not limited to the configuration shown in FIG. 5.

[Receiving Device 200]

Figure 7:
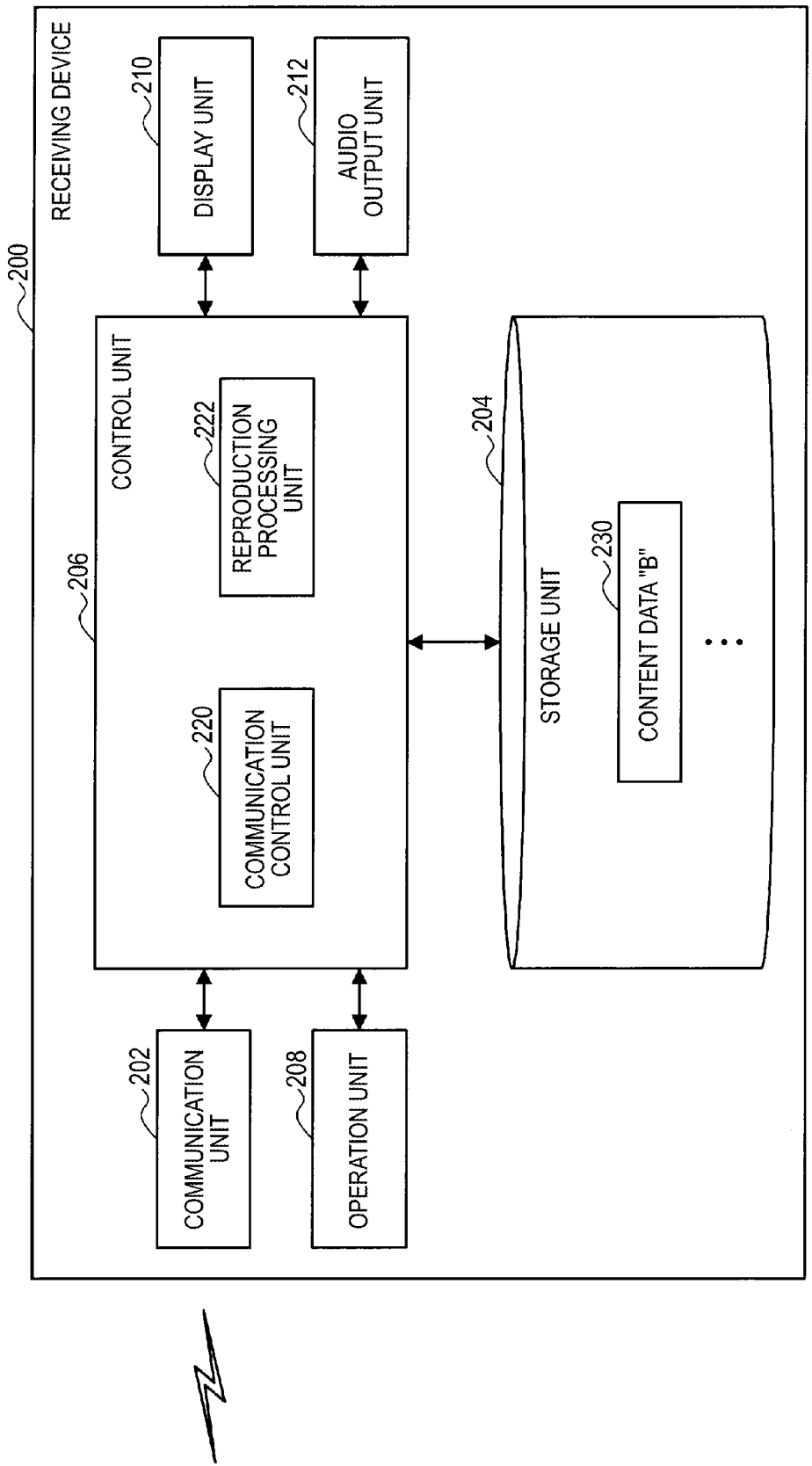
FIG. 7 is a block diagram showing an example of a configuration of a receiving device according to the embodiment of the invention.

FIG. 7 is a block diagram showing an example of a configuration of the receiving device 200 according to the embodiment of the invention. The receiving device 200 includes a communication unit 202, a storage unit 204, a control unit 106, an operation unit 208, a display unit 210 and an audio output unit 212.

The receiving unit 200 may also include a ROM (not shown), a RAM (not shown), a storage unit (not shown) and so on. The receiving unit 200 connects respective components through a bus as a data transmission path.

Here, the ROM (not shown) stores data for control such as programs and calculation parameters used by the control unit. The RAM (not shown) temporarily stores programs and the like executed by the control unit. The RAM (not shown) can also functions as a buffer.

[Hardware Configuration of the Receiving Device 200]

The receiving device 200 has a hardware configuration which is similar to, for example, the transmission device shown in FIG. 6. When applying the above configuration, the MPU 150 or the DSP 166 functions as the control unit 206 and the recording medium 156 functions as the storage unit 204 in the receiving unit 200. Additionally, the operational input device 160 functions as the operation unit 208 and the display device 162 functions as the display unit 210 in the receiving unit 200 when applying the above configuration. Furthermore, the communication interface 164 function as the communication unit 202 and the audio output device 168 functions as the audio output unit 212 in the receiving unit 200 when applying the above configuration. It goes without saying that the configuration of the receiving unit 200 according to the embodiment of the invention is not limited to the configuration similar to the transmission device 100 shown in FIG. 6.

The communication unit 202 is a communication means included in the receiving device 200, performing communication with external devices such as the transmission device 100 and the server (not shown) by wireless/wired communication through the network (or directly). The communication by the communication unit 202 is controlled by, for example, the control unit 204. As the communication unit 202, for example, the IEEE port 802.11g port and the transmission/reception circuit (wireless communication), the LAN terminal and the transmission/reception circuit (wired communication) and so on can be cited.

The storage unit 204 is a storage means included in the receiving unit 200, which stores various data, for example, content data, applications and so on. Here, the case in which content data B 230, . . . is stored in the storage unit 204 is shown.

The control unit 206 includes, for example, a MPU, an integrated circuit in which various types of processing circuits are integrated and the like, having a function of controlling the entire receiving device 200. The control unit 206 includes a communication control unit 220 and a reproduction processing unit 222, mainly performing processing relating to, for example, the receiving device 200 shown in FIG. 2.

The communication control unit 220 controls the communication unit 202 to mainly perform processing relating to communication with external devices such as the transmission device 100. More specifically, when the control unit 202 receives, for example, various types of requests, the measurement signal and so on transmitted from the transmission device 100, the communication control unit 220 performs processing corresponding to the received various types of requests or the measurement signal, allowing the communication unit 202 to transmit responses corresponding to the various requests.

The communication control unit 220 allows the communication unit 202 to transmit the adjustment signal based on an operation signal corresponding to a given user operation transmitted from, for example, the operation unit 208. Here, as the given user operation relating to the transmission of the adjustment signal, for example, "to operate a dedicated operation device for transmitting the adjustment signal included in the receiving device 200 by the user" can be cited, however, the given user operation is not limited to the above. For example, the communication control unit 220 may allow the communication unit 202 to transmit the adjustment signal when the user makes a power source of the receiving device 200 in the effective state (for example, when a power button is pressed).

The reproduction processing unit 222 has a function of reproducing content data. More specifically, the reproduction processing unit 222 reproduces content data included in transmission data at the time defined by time information included in the transmission data, for example, received by the receiving unit 202. The reproduction processing unit 222 reproduces content data stored in the storage unit 204 based on the operation signal corresponding to the user operation transmitted from, for example, the operation unit 208. Then, the reproduction processing unit 222 allows the display unit 210 to display video corresponding to the processing result and allows the audio output unit 212 to output audio corresponding to the processing result.

The control unit 206 includes the communication control unit 220 and the reproduction processing unit 222 to thereby mainly perform processing relating to, for example, the receiving device 200 of FIG. 3.

The operation unit 208 is an operation means included in the receiving device 200 which can be operated by the user. The receiving device 200 includes the operation unit 208 to enables the user to operate the device and can perform processing desired by the user in response to the user operation. Here, as the operation unit 208, for example, buttons, direction keys, a rotational selector such as a jog dial, or combinations of the above can be cited. The receiving device 200 may include a dedicated operation device for transmitting the adjustment signal as the operation unit 208.

The display unit 210 is a display means included in the receiving device 200, displaying various information on a display screen. As screens displayed on the display screen of the display unit 210, for example, an operation screen for allowing the receiving device 200 to perform desired operations, a content reproduction screen corresponding to the reproduction of content data processed by the reproduction processing unit 222 and the like can be cited. Here, as the display unit 210, for example, the LCD, the organic EL display and so on can be cited.

The audio output unit 212 outputs audio corresponding to content data processed by the reproduction processing unit 222. As the audio output unit 212, for example, an amplifier, a speaker and the like can be cited.

The receiving device 200 performs processing relating to, for example, the receiving device 200 of FIG. 3 by, for example, the configuration shown in FIG. 7, which can reproduce content data included in transmission data at the time defined by time information included in the received transmission data.

The configuration of the receiving device 200 according to the embodiment of the invention is not limited to the configuration shown in FIG. 7. For example, the receiving device 200 according to the embodiment of the invention may include the configuration similar to the control unit 106 shown in FIG. 5 and perform processing relating to the data transmission approach according to the embodiment of the invention. That is, the receiving unit 200 according to the embodiment of the invention may have functions as the transmission device 100 according to the embodiment of the invention. The receiving device according to the embodiment of the invention may also include, for example, a distance estimation unit (not shown) for estimating distances to the transmission device 100 in accordance with field effect intensity of the received measurement signal.

As described above, the content reproduction system 1000 according to the embodiment of the invention includes the transmission device 100 and the receiving devices 200. The transmission device 100 performs the processing (1) (distance measurement processing) to the processing (3) (transmission processing) to thereby transmit transmission data to the receiving devices 200 all at once. Here, the transmission device 100 sets time information in which delay times corresponding to distances measured in the processing (1) (distance measurement processing) are taken into account with respect to each receiving device 200 to set transmission data with respect to each receiving unit 200. The receiving unit 200 reproduces content data included in the transmission data at the time defined by time information included in the received transmission data. Accordingly, occurrence of the lag (unintentional lag) due to delay in audio outputted from respective devices in the content reproduction system 1000 at the position of the reference device can be prevented in the content reproduction system 1000. Therefore, the probability of giving uncomfortable feeling to the user due to the unintentional lag can be reduced in the content reproduction system 1000. Also in the content reproduction system 1000, it is possible to reduce the uncomfortable feeling even when a special operation by the user such as volume adjustment for reducing uncomfortable feeling, therefore, there in no danger of reducing user-friendliness. Furthermore, the transmission device 100 can create the pseudo-surround effect such as the multichannel audio system by generating intentional lags in audio outputted from respective devices in content reproduction system 1000.

Therefore, the transmission device 100 performs the above processing (1) (distance measurement processing) to the processing (3) (transmission processing), thereby realizing the content reproduction system capable of providing listening experience more suitable for the user who listens to audio corresponding to the reproduction of content data.

As described above, the transmission device 100 has been explained as an example of components included in the content reproduction system 1000 according to the embodiment of the invention, however, the embodiment of the invention is not limited to the above mode. The embodiment of the invention can be applied to various apparatus, for example, computers such as a PC (personal computer), a server, a PDA (Personal Digital Assistant), portable communication devices such as a cellular phone and a PHS (Personal Handyphone System), video/music reproduction devices, video/music recording/reproduction devices, game machines and so on.

The receiving device 200 has been explained as an example of components included in the content reproduction system 1000 according to the embodiment of the invention, however, the embodiment of the invention is not limited to the above mode. The embodiment of the invention can be applied to various apparatus, for example, computers such as the PC, portable communication devices such as the cellular phone, video/music reproduction devices, video/music recording/reproduction devices, game machines and so on.

(Programs According to the Embodiment of the Invention)

The transmission data including time information in which delay times corresponding to measured distances among devices are taken into account can be set with respect to the respective receiving devices of transmission targets and the set transmission data can be transmitted to corresponding receiving devices by a program for allowing a computer to function as the transmission device according to the embodiment of the invention. Accordingly, the program for allowing the computer to function as the transmission device according to the embodiment of the invention is used, thereby realizing the content reproduction system capable of providing listening experience more suitable for the user who listens to audio corresponding to the reproduction of content data.

The preferred embodiment of the invention has been explained with reference to attached drawings as the above, and it goes without saying that the invention is not limited to the above example. It is apparent that those in the art can reach various alternation examples or modification examples within the scope described in the appended claims and can recognize that these naturally belong to the technical scope of the invention.

For example, the transmission device 100 of FIG. 5 can include the request transmission unit 120, the synchronization processing unit 122, the distance measurement unit 124, the transmission data setting unit 126, the transmission processing unit 128 and reproduction processing unit 130 separately (for example, respective units are realized by individual processing circuits).

For example, it is shown that the program (computer program) for allowing the computer to function as the transmission device according to the embodiment of the invention is provided as the above, however, the embodiment of the invention can also provide a storage medium in which the program is stored.

The above configuration shows an example of the embodiment of the invention and naturally belongs to the technical scope of the invention.

The present application contains subject matter related to that disclosed in Japanese Priority Patent Application JP 2010-056343 filed in the Japan Patent Office on Mar. 12, 2010, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A transmission device comprising:
 a communication unit to perform communication with one or more receiving devices;
 a distance measurement unit to measure direct distances to the receiving devices;
 a transmission data setting unit to set transmission data including content data including audio to be transmitted and time information indicating a time when reproduction of content data is started with respect to the receiving devices distances of which are measured based at least in part on the measured distances to the receiving devices; and
 a transmission processing unit to transmit transmission data set by the transmission data setting unit to corresponding receiving devices of transmission targets all at once,
 wherein the transmission data setting unit sets a time when the device starts reproduction of the content data as a reference time, and sets the time information for synchronizing audio indicated by the content data reproduced in the device with audio indicated by the content data reproduced in the receiving devices with respect to each receiving device using the set reference time as a reference.

2. The transmission device according to claim 1,
 wherein, when the communication unit receives an adjustment signal for changing the device to be the reference of time when the reproduction of content data is started, the transmission data setting unit sets the time when the receiving device which has transmitted the adjustment signal starts reproduction of content data as a reference time, and sets the time when the device itself starts reproduction of the content data and the time information with respect to the respective devices using the reference time set based at least in part on the adjustment signal as a reference.

3. The transmission device according to claim 1 or 2, further comprising:
a storage unit to store at least one or more pieces of reproduction control information defining adjustment time adjusting a time interval between the reference time and the time when reproduction of the content data is started by being associated with the direct distance to a receiving device,
wherein the transmission data setting unit sets the time information by reflecting the adjustment time based on the measured distances to the receiving devices and the selected reproduction control information.

4. The transmission device according to claim 1 or 2, wherein the distance measurement unit transmits a measuring signal for measuring distances to the receiving devices to measure distances based at least in part on a time interval between the time when the measurement signal is transmitted and the time when a response signal transmitted from the receiving device receiving the measurement signal is received.

5. The transmission device according to claim 1 or 2, wherein the distance measurement unit transmits a measuring signal for measuring distances to the receiving devices to measure distances based at least in part on a time interval between the time when the measurement signal is transmitted and the time indicated by information of the time when the measurement signal is received in the receiving device included in the response signal transmitted from the receiving device receiving the measurement signal.

6. The transmission device according to claim 1 or 2, further comprising:
a reproduction processing unit to reproduce the content data based at least in part on the time when the device itself starts reproduction of the content data set by the transmission data setting unit.

7. A transmission method comprising the steps of:
measuring direct distances from a transmission device transmitting transmission data including content data including audio to be transmitted and time information indicating a time when reproduction of the content data is started to respective receiving devices of transmission targets of the transmission data;
setting transmission data in which the time information is set based at least in part on distances to the respective receiving devices measured in the step of measuring distances with respect to the respective receiving devices; and
transmitting transmission data set in the step of setting data to corresponding receiving devices of transmission targets all at once,
wherein, in the step of setting transmission data, a time when the transmission device starts reproduction of the content data is set as a reference time and the time information for synchronizing audio indicated by the content data reproduced in the transmission device with audio indicated by the content data reproduced in the receiving devices with respect to the respective receiving devices of transmission targets using the set reference time as a reference.

* * * * *